United States Patent [19]

Yasumatsu et al.

[11] 4,192,901

[45] Mar. 11, 1980

[54] MILK-CONTAINING ACID SYRUP

[75] Inventors: Mutsuo Yasumatsu; Shinichi Shoji; Koichi Sakamoto; Takao Kurihara, all of Tokyo; Takeshi Terabayashi, Misato; Kasutaka Ohmura, Kashiwa, all of Japan

[73] Assignee: Calpis Shokuhin Kogyo Kabushiki Kaisha, Tokyo, Japan

[21] Appl. No.: 864,874

[22] Filed: Dec. 27, 1977

[51] Int. Cl.$^2$ .......................... A23C 3/02; A23C 9/10; A23C 9/12
[52] U.S. Cl. ........................ 426/580; 426/43; 426/584; 426/590; 426/522
[58] Field of Search ............... 426/580, 584, 590, 522, 426/43, 583

[56] References Cited

U.S. PATENT DOCUMENTS

| 3,539,363 | 11/1970 | Morgan et al. | 426/522 X |
| 3,800,052 | 3/1974 | Inagami et al. | 426/590 X |
| 3,932,680 | 1/1976 | Egli et al. | 426/522 X |

FOREIGN PATENT DOCUMENTS 122663 10/1977 Japan.

OTHER PUBLICATIONS

Webb et al., Byproducts From Milk, 2nd Ed., The Avi Publishing Co., Inc., Westport, Conn., 1970 (pp. 239-244).

*Primary Examiner*—David M. Naff
*Attorney, Agent, or Firm*—Stevens, Davis, Miller & Mosher

[57] ABSTRACT

A method for the production of a milk-containing acid syrup which has a stable dispersion of protein and which syrup is consumed by diluting with water or carbonated water for drinking is disclosed. The milk-containing acid syrup is produced by causing an added sugar to be contained in the amount of from 20 to 52 w/w% in an acidified milk which satisfies the conditions $0.85 \leq x \leq 2.55$, $y \leq -0.27x + 4.15$ (x denotes the casein content in the acidified milk and y the pH value of the acidified milk) and heating the resultant mixture (sugar-added acidified milk) at 100° to 160° C.

20 Claims, 1 Drawing Figure

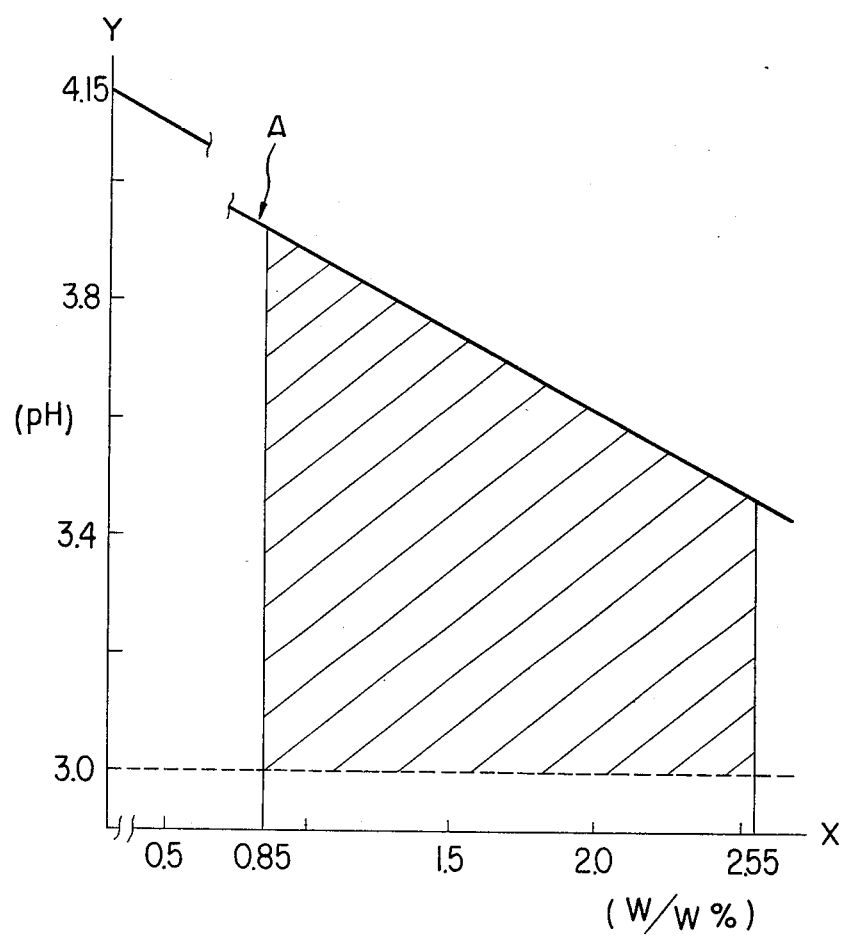

MILK-CONTAINING ACID SYRUP

BACKGROUND OF THE INVENTION

This invention relates to a milk-containing acid syrup and a method for the production of the same.

In the conversion of milk into an acidified milk by fermentation or by addition of an acid, casein contained in the milk coagulates in the form of coarse particles as the milk surpasses its isoelectric point, and the coarse particles are liable to precipitate in accordance with Stokes' law because these particles are hydrophobic. In the circumstances, various studies have been continued to produce an acidified milk beverage in which the casein is stably dispersed over a long period.

The phenomenon of precipitation of coarse casein particles mentioned above becomes conspicuous as the casein content increases, so the milk-containing acid beverages which are actually available in the market are limited to the so-called straight drinks (ready-to-drink) having a lowered casein content (about 0.3 w/w% in the acidified milk contemplated by this invention) and syrups of a higher casein content (about 2.4 w/w% in the acidified milk contemplated by this invention) which contain therein more than 50 w/w% of sugar so as to increase the viscosity and specific gravity of their liquid portion.

The above mentioned syrups containing a higher casein content are drunk by diluting with water or carbonated water to about 5 times the original volume.

In the case of a syrup containing more than 50 w/w% of sugar, there is a problem of excessive caloric intake which has been causing increased public concern. Especially when the sugar content is disproportionately high as compared with good body of the acidified milk, the consumer diluting the syrup tends to rely on the degree of sweetness as a criterion for dilution and, consequently, takes more sugar than is normally required. The use of sugar in a large amount also entails the problem of high price of sugar. In these circumstances, there has been felt the need for lowering the sugar content of such a syrup without impairing the stable dispersion of casein (without lowering the casein content). The inventors have made studies on a method of the production of a syrup which has an excellent stability of dispersed casein even when its sugar content is lowered. They have consequently achieved the object by incorporating a novel idea into the conventional technique and further providing a method for the production of a stable syrup which permits its casein content and sugar content to be varied in greater ranges than those attainable in the conventional syrups. Thus, the method of the present invention provides not merely syrups which, like the conventional countertypes, are drunk after dilution to about 5 times the original volume but also syrups being diluted to from about 2 to about 6 times the original volume.

SUMMARY OF THE INVENTION

It is the primary object of this invention to provide a milk-containing acid syrup which has the dispersibility of casein remarkably enhanced.

Another object of this invention is to provide a milk-containing acid syrup which does not require any special stabilizer for the stable dispersion of casein at all.

Still another object of this invention is to provide a milk-containing acid syrup which permits its casein content and sugar content to be varied, which is readily prepared for consumption by diluting with water or carbonated water to a volume from about 2 to 6 times the original volume.

Still another object of this invention is to provide a milk-containing acid syrup which has a sugar content relatively decreased comparing with those produced by the conventional method of heating at less than 100° C.

Still another object of this invention is to provide a milk-containing acid syrup which has varying degrees of whiteness and thereby gives various whiteness to beverages diluted.

Further still another object of this invention is to provide a milk-containing acid syrup which has little degradation of flavor.

BRIEF DESCRIPTION OF THE DRAWING

The drawing shows the relation between the pH value (y) and the casein content (x) of the acidified milk defined by the present invention. In the graph, the line A represents an equation: $y = -0.27x + 4.15$.

DETAILED DESCRIPTION OF THE INVENTION

This invention comprises causing an added sugar to be contained in the amount of from 20 to 52 w/w% in an acidified milk satisfying the conditions:

$$0.85 \leq x \leq 2.55$$

$$y \leq -0.27x + 4.15$$

wherein, x denotes the casein content in the acidified milk (w/w%) and y the pH value of the acidified milk, subjecting the resultant mixture (sugar-added acidified milk) to an ultra-high temperature heating at 100° C. to 160° C. to enhance the casein dispersion.

The salient feature of the present invention resides in subjecting the sugar-added acidified milk, while in a state containing therein not less than 20 w/w% of sugar added, to the ultra-high temperature heating at a temperature of not less than 100° C. It has heretofore been customary to perform the heating of the sugar-added acidified milk at a temperature less than 100° C., generally at about 80° C. no matter whether the heating has an impairing effect to the dispersibility of casein or an enhancing effect to the dispersibility of casein. In the conventional production of milk-containing acid syrups, the heat treatment is not given for stabilizing the dispersion of casein but for sterilizing. Further, because of high sugar contents, the heating is given at a temperature of about 80° C. so as to prevent possible degradation of flavor or change of color to brown. The novelty of the present invention is based on the fact that in the production of a syrup the heating is given to enhance the stability. As will be illustrated afterward in experiments, the heating performed in accordance with the present invention gives better results in the production of a syrup having the properties aimed at by the present invention than the conventional heating performed at a temperature less than 100° C.

As described above, the salient feature of the present invention resides in the requirement that the sugar-added acidified milk, while in a state incorporating therein not less than 20 w/w% of sugar, should be subjected to the ultra-high temperature heating at a temperture of not less than 100° C. Nevertheless, it is also an important characteristic of the present invention that the requirement just mentioned should be specifically correlated with the prescribed relationship between the casein content and the pH status of the acidified milk.

The present invention will be described more specifically herein below.

Since the casein content (x) and the pH value (y) of the acidified milk are closely related to each other, the specific range of the casein content (x) and the equation $y \leq f(x)$ both mentioned above should be satisfied by the acidified milk being prepared in the production of the syrup of this invention. From the standpoint of the stability of casein dispersion, a lower limit of the pH value, in its nature, should not be defined. To enjoy delicious beverages, however, the pH value is desired to be not lower than about 3.0 so that the acid taste will not be too strong.

The conditions $0.85 \leq X \leq 2.55$ and $y \leq -0.27x + 4.15$ depend on the basis of the acidified milk prior to the addition of sugar or the acidified milk deducting the added sugar. If the addition of sugar takes place before the milk is acidified, it is calculated that the acidified milk is the balance which remains after deduction of the added sugar. And the sugar added before the acidification of milk should be calculated for the sugar specified by the present invention. This acidified milk is prepared by the process of lactic acid fermentation or the process of an edible acid incorporation or the combination of these two processes. The term "milk" as used in this invention refers to a skimmed animal milk. Examples of acids include lactic acid, citric acid, malic acid and other similar organic acids, phosphoric acid and acids obtained in the form of suitable combinations of these acids.

The specific casein content (x) of the acidified milk is the content in the acidified milk which is in the state prior to the addition of sugar (in the amount of from 20 to 52 w/w%). The reason for defining the actual milk content by the casein content without showing by the milk content is that the casein is particularly important both qualitatively and quantitatively for the stability of milk protein dispersion. In this respect, the preparation of acidified milk by the addition of casein or sodium caseinate is also embraced in the present invention. To milk or the acidified milk of this invention may be added whey protein, vegetable protein or single cell protein suitably to an extent not detrimental to the attainment of the effect of the present invention. If the casein content exceeds 2.55 w/w%, the ultra-high temperature heat treatment brings about a feeble effect or no discernible effect in the stabilization of casein dispersion. If the casein content is less than 0.85 w/w%, good body of the syrup is inferior when consumed in a diluted form. There is neither economic significance nor practical merit at all in producing a syrup having such a low casein content.

The added sugar is contained in the acidified milk in such an amount that its content in the resultant mixture (sugar-added acidified milk) will be from 20 to 52 w/w%. It is desirable to adjust the sugar content in the range of from 20 to 35 w/w%, more preferably from 30 to 35 w/w% when the casein content (x) is in the range of from 0.85 to 1.7 w/w%. If the casein content is low and the sugar content is excessively high (more than 35 w/w%), the stability of the casein dispersion is excellent but the obtained syrup gains a conspicuous sweetness. It is also desirable to control the sugar content in the range of from 35 to 52 w/w%, more preferably from 40 to 52 w/w% when the casein content (x) is in the range of from 1.7 to 2.55 w/w%. If the sugar content is less than 20 w/w%, the addition of sugar is not sufficiently effective in stabilizing the casein dispersion. If the sugar content is more than 52 w/w%, the effect of the stabilization of casein dispersion is ascribable to the high viscosity resulting from the high sugar content. This effect is attainable sufficiently by the conventional technique without adopting the present invention. Though the amount of sugar 52 w/w% is about the same as involved in the preparation of conventional syrups, as will be described more specifically afterward, the effect of the stabilization of casein dispersion attained by the present invention is higher than by the conventional technique. Therefore, the syrup to be produced by the present invention has higher stability (with inclination toward enhanced dissolvability of casein) and a higher casein content than that produced by the conventional technique. This is the point of this invention that the upper limit of the sugar content in the sugar-added acidified milk is fixed at 52 w/w%.

The addition of sugar can be carried out at any desired step in the process preceding the ultra-high temperature heat treatment. It may be effected prior to the acidification of the milk as the raw material, for example. A portion of sugar which is set aside from the total amount of sugar to be added is added after the ultra-high heat treatment but before the temperature of the mixture falls below about 80° C. This split addition of sugar is more or less effective but has a disadvantage that the effect of stabilization of casein dispersion is degraded when the portion so set aside is too large and the portion of sugar thus set aside must be preheated for sterilization separately prior to its addition to the mixture.

Examples of sugars which are usable for the present invention include monosaccharides such as glucose and fructose, disaccharides such as sucrose, and oligosaccharides. These may be used alone or in the form of a mixture of two or more kinds.

In the present invention, the casein content (x) in the acidified milk should fall within a specific range and the pH value of the acidified milk should satisfy the specific equation of $y \leq f(x)$ and the ultra-high temperature heating should be performed in the presence of sugar of an amount falling within a specific range. This ultra-high temperature heating is novel in the sense that it is performed at a temperature ranging from 100° C. to 160° C. Particularly the heat treatment which is carried out at a higher temperature in the range of from 125° C. to 160° C. permits the effect of this invention to manifest quite conspicuously. Any heat treatment performed at more than 160° C. is not desirable, because the treatment increases the thermal load and tends to damage the flavor (particularly when there is used a fermented milk) or impart an off-flavor by heating. The effect of stabilizing the casein dispersion which is brought about by the heat treatment at a temperature in the range of from 100° C. to 160° C. increases with the increasing temperature and the increasing sugar content. Under these conditions, the casein particles are more finely divided, given more improved stability of dispersion and eventually permitted to acquire an increasing degree of transparency, and assume the so-called dissolved state.

At such extremely high temperatures, sufficient heating is obtained in a duration of from 2 to 100 seconds. This duration may be varied to some extent, depending on the conditions of the acidified milk or on the amount of sugar to be added. In the production of a syrup by the conventional method, the heating at a temperature of about 80° C. is required to last for a long period of 20 to 30 minutes and this prolonged heating impairs the flavor of the product. In this respect, it is rather desirable that the present invention carries out the short time heating at the extremely high temperature. When the heating at a temperature over 100° C. is performed in the medium of water (steam), it becomes necessary to use pressure. Also in this respect, the method of heating in the present invention differs from the heating which is performed to sterilize the syrup of the conventional method.

After the ultra-high temperature heat treatment, the syrup sometimes happens to have a degree of whiteness (L value) of more than about 55 and the casein particles are still coarse, indicating that the effect of stabilization of casein dispersion is insufficient. Even in such a case, the effect of stabilization attained by the present invention is still better than the effect brought about by the conventional heating at a temperature of about 80° C. When the degree of whiteness (L value) of the syrup after the heat treatment is not more than about 55 the method of this invention can be rated as having its effect manifest sufficiently. By filling a container with the syrup which has a degree of whiteness of not more than about 55, there can be provided a syrup excellent in stability. The term "degree of whitenes" used herein refers to the lightness (L value) to be determined by the color-difference meter which determines the color tone and the shade of color in a numerical value. The degree of whiteness increases as the numerical value gets larger. Conversely, the degree of whiteness decreases as the numerical value decreases. The transparency gains in intensity as the value falls below the level of about 35. The measurement of the L value of the syrup obtained by the present invention is carried out by placing the syrup in its undiluted form in the measuring cell of the color-difference meter. When the degree of whiteness (L value) falls in the neighborhood of 60, the casein particles are so coarse that they tend to precipitate. As this value further increases, the casein particles completely precipitate immediately after the syrup has been prepared, rendering the measurement itself totally useless.

Although none of the treatments which are performed after the ultra-high temperature heat treatment constitutes a specified element of the construction of this invention, it is desirable from the standpoint of operational efficiency to dispense the syrup in the containers shortly after the ultra-high temperature heat treatment and well before its temperature falls below the ordinary sterilizing temperature.

For use as a commercial beverage, the syrup to be obtained by this invention is suitably rated as a grade for dilution to about 2 to 4 times the original volume when the casein content is from 0.85 to 1.7 w/w% and the sugar content is from 20 to 35 w/w% or as a grade for dilution to about 4 to 6 times the original volume when the casein content is from 1.7 to 2.55 w/w% and the sugar content is from 35 to 52 w/w%. The syrup produced by the conventional method has a high sugar content as compared with the good body of the acidified milk. If this syrup is diluted according to the sugar content as the criterion of dilution, then the flavor of the acidified milk (particularly the fermented milk) is proportionately diluted at the same time. On the contrary, as specifically disclosed in Experiment 2 and Example 1, the method of this invention permits one to decrease the sugar content of the syrup without lowering the casein content, and thereafter the diluted syrup retains the flavor of the acidifed milk unimpaired relatively. At a certain step in the whole process of the production of this syrup, fruit juice, flavoring agent, coloring agent or some other additive may suitably be added without jeopardizing the effect of this invention. The syrup obtained by this invention may also be used suitably as paste, spread, material for cocktails, etc. and raw material of various foodstuffs such as, for example, gelled desserts.

In the syrup of this invention, a floating agglomerate is occasionally observed in the top portion of the syrup. This is a mass-like cloud of casein particles finely divided as the effect of the present invention. Unlike the precipitate which is formed at the bottom of a container, this floating agglomerate is readily broken up and uniformly dispersed by slightly shaking. Thus, it does not spoil the true value of this syrup.

It has never been anticipated by the conventional technique that a sugar-added acidified milk having such a high casein content can be treated to stably disperse the casein to the point where the syrup assumes transparency. To be more specific, where the syrup produced by the conventional method requires a sugar content of 50 w/w%, the syrup of this inventon allows even a lowered sugar content of about 45 w/w% to produce the stable syrup (even through the quantity of the acidified milk to be used therein increases proportionately and the casein content in the syrup is consequently increased). When the syrup is desired to offer a higher degree of transparency at the time of its consumption, the ultra-high temperature heating can be performed at an elevated temperature of not less than 125° C. and, the sugar content can be decreased to not more than 40 w/w%. Consequently, if the present invention is carried out with the sugar content of 50 w/w%, there can be produced a syrup having a higher casein content than the conventional countertype. Also in the production of various grades of syrups having different casein contents and sugar contents from those in the conventional syrups, the method of the present invention brings about a much better effect than the conventional method which generally gives the heat treatment at a temperature of 80° C.

It seems that the combination of the presence of sugar with the ultra-high temperature heating gives some significance to such a conspicuous effect of the present invention as described above.

The presence of sugar is believed to bring about the following three effects:
(1) The effect of reducing the coarse casein particles to finer particles, owing to the ultra-high temperature heat treatment, wherein coarse casein particles were formed in consequence of the surpassing of the isoelectric point.
(2) The effect of preventing the stably dispersed casein particles from re-coagulating into coarse particles.
(3) The effect of increasing the specific gravity and viscosity of the solution and thereby preventing the dispersed casein particles from being gravitationally precipitated (in accordance with Stokes' law). Of these three effects, that of (3) plays an important role and that of (2) a more or less appreciable role in the conventional method of producing the syrup, whereas in the production by the method of this invention, that of (1) discharges a striking role and that of (2) is apparently enhanced consequently. In other words, during the ultra-high temperature heat treatment, the casein undergoes some form of reaction with sugar and, hydrophilic property of the casein is significantly enhanced. Of course, the effect of (3) is important for the present invention, but the effects of (1) and (2) are so conspicuous that the present invention does not need to depend entirely upon the effect of (3). This gives birth to the conspicuous fact that where the conventional syrup requires addition of more than 50 w/w% of sugar in the course of its production, the method of this invention allows the syrup produced to contain a decreased amount of sugar.

The present invention will be described more specifically herein below with reference to experiments and working examples.

Experiment 1:

1,400 kg of skim milk which was prepared by mixing water and cow's powdery skim milk was sterilized at 90° C. for 15 seconds and then cooled to 20° C. To this skim milk was quickly added an aqueous 50% lactic acid solution to adjust the pH value of the resultant milk solution to 3.50. Consequently, there was obtained an acid-added milk (having a casein content of 1.7%). This acidifed milk of pH 3.50 was divided into seven aliquots each of about 200 kg. To the seven aliquots of acidified milk, sucrose was added to be dissolved therein so that each might have different sugar concentrations of 0, 10, 20, 30, 40, 45 and 52%. Each of the sugar-added acidified milk solutions thus prepared was further divided into four sub-aliquots, which were heated in a tubular type heat exchanger at 80°, 102°, 125° and 160° C. respectively for about 10 seconds. From the heat exchanger, the heated sugar-added acidified milk solutions were discharged at 82° C. and immediately hot packed in 200-ml bottles and thereafter quickly cooled. The bottled milk solutions were preserved as test specimens at normal room temperature, most of specimens for three months and the remainders for one year. At the end of the standing, they were examined for possible precipitation at the bottom of the bottles.

Table 1

| Sugar content(%) | Temperature (°C.) of heating | | | |
|---|---|---|---|---|
| | 80 | 102 | 125 | 160 |
| 52 | −(±) | −(−) | −(−) | −(−) |
| 45 | ± | − | − | − |
| 40 | + | − | − | − |
| 30 | +++ | ± | − | − |
| 20 | +++ | + | − | − |
| 10 | ++++ | ++ | + | ± |
| 0 | ++++ | ++ | + | ± |

The rating of precipitation was made on the scale, wherein:
  −denotes absence of precipitation or a negligible degree thereof,
  ±denotes occasional precipitation to a slight extent,
  +denotes a slight degree of precipitation,
  + +denotes rather heavy precipitation,
  + + +denotes heavy precipitation, and
  + + + +denotes quite heavy precipitation.
The results indicated in parentheses are those obtained of the specimens preserved for one year.

As is clear from Table 1, the effect of the present invention was clearly manifested when the sugar content was not less than 20 w/w% and temperature of the ultra-high temperature heat treatment was not less than 100° C. It is also seen that the effect was decidedly conspicuous when the sugar content exceeded 30 w/w% or the temperature of the treatment exceeded 125° C. Some of the control specimens having a sugar content of 52% and heated at 80° C. produced a slight degree of precipitate after one year's standing. Because of the precipitate, those control specimens which produced the precipitate were distinguishable from the test specimens of the present invention having a sugar content of 52%.

Experiment 2:

200 kg of skim milk which was obtained by skimming fresh cow's milk was sterilized at 90° C. for 15 seconds and thereafter cooled to 37° C. The skim milk was mixed with 3% of a starter of Lactobacillus bulgaricus, then fermented at 37° C. for 24 hours. To the fermented milk was added an aqueous 50% lactic acid solution of an amount enough to prepare a lactic acid fermented milk of pH 3.30 (having a casein content of 2.5%). The acidified milk thus produced was homogenized in a homogenizer under the pressure of 150 kg/cm² and sucrose was added thereto to give a sugar content of 40%. The sugar-added acidified milk solution prepared above was divided into six aliquots, which were heated in a tubular type heat exchanger at the respective temperatures of 80°, 102°, 110°, 125°, 140° and 160° C. for about 10 seconds. From the heat exchanger, the heated milk solutions were discharged at 85° C. and immediately hot packed in 200-ml bottles and then quickly cooled. As test specimens, these bottled milk solutions were preserved at normal room temperature for three months in order to observe the degree of precipitate at the bottom of the bottles.

Table 2

| Temperature of heating (°C.) | 80 | 102 | 110 | 125 | 140 | 160 |
|---|---|---|---|---|---|---|
| Degree of Whiteness | 63.0 | 53.7 | 49.9 | 45.1 | 41.8 | 35.2 |
| Appearance | White | White | White | White | Slightly transparent | High transparent |
| Precipitate | +++ | ++ | + | − | − | − |

The rating was made on the same scale as used in Experiment 1. The degree of whiteness was measured immediately after preparation of the syrup. As is evident from Table 2, the formation of precipitate decreased and the degree of whiteness also decreased as the temperature of the heat treatment increased to not less than 100° C. This means that the stability of casein dispersion increased as the temperature of the heat treatment increased. The fact that a syrup of an extremely high degree of transparency can be produced even when the casein content is higher than in the conventional syrup proves that the effect of the stabilization of casein dispersion brought about by the present invention is quite conspicuous.

Example 1:

On a plate type heat exchanger, 30 kg of skim milk obtained by skimming fresh cow's milk was sterilized at 90° C. for 15 seconds. The heated skim milk was then cooled to 37° C. and mixed with 3% of a mixed starter of Lactobacillus blugaricus and Streptococcus thermophilus, and fermented at 37° C. to afford a lactic acid fermented milk of pH 3.40 (having a casein content of 2.4 w/w%). The acidified milk thus prepared was homogenized in a homogenizer under the pressure of 140 kg/cm² and subsequently added thereto sucrose of an amount enough to give a sugar content of 45 w/w%. The sugar-added acidified milk solution thus obtained was subjected to heating in a tubular type heat exchanger at 135° C. for about 10 seconds. The heated solution which was discharged at 84° C. from the heat exchanger was immediately mixed with 0.35% of lemon flavoring agent and, before the liquid temperature fell below the level of 80° C., hot packed in 633-ml brown bottles and quickly cooled. After standing at normal room temperature for six months, the dispersion of casein was satisfactory. The syrup, when diluted with cold water to five times the original volume, became a beverage having a suppressed sweetness and an excellent flavor.

Example 2:

An acidified milk (having a casein content of 1.4 w/w%) was prepared by mixing 750 g of cow's powdery skim milk with 14.3 kg of water and adjusting the pH value of the resultant mixture with an aqueous 50% citric acid solution to 3.40. This acidified milk was mixed and dissolved with 5.50 kg of glucose and 1.37 kg of fructose (to a total sugar content of 31 w/w%). The sugar-added acidified milk solution thus obtained was passed through a tubular type heat exchanger to be heated at 150° C. for about 10 seconds. From the heat exchanger, the heated solution was discharged at 85° C. It was immediately mixed with 0.4% of lemon lime flavoring agent and, before the liquid temperature fell below the level of 80° C., hot packed in 633-ml brown bottles and quickly cooled. After standing at normal temperature for six months, the dispersion of casein was satisfactory. The syrup, when diluted with cold water to three times the original volume, became a beverage having an excellent flavor.

What is claimed is:

1. A method for the manufacture of a milk-containing acid syrup, which method comprises adding sugar in the amount of from 20 to 52 w/w% to an acidified milk satisfying the conditions:

$$0.85 \leq x \leq 2.55$$

$$y \leq -0.27x + 4.15$$

(wherein, x stands for the casein content in said acidified milk (w/w%) and y for the pH value of the acidified milk) and subjecting the sugar-added acidified milk to an ultra-high temperature heating at 100° C. to 160° C.

2. The method of claim 1, wherein the sugar content to be added is in the range of from 20 to 35 w/w% when the casein content is $0.85 \leq x \leq 1.7$.

3. The method of claim 2, wherein the sugar content to be added is in the range of from 30 to 35 w/w%.

4. The method of claim 1, wherein the sugar content to be added is in the range of from 35 to 52 w/w% when the casein content is $1.7 \leq x \leq 2.55$.

5. The method of claim 4, wherein the sugar content to be added is in the range of from 40 to 52 w/w%.

6. The method of claim 1, wherein the ultra-high temperature heating is in the range of from 125° to 160° C.

7. The method of claim 2, wherein the ultra-high temperature heating is in the range of from 125° to 160° C.

8. The method of claim 3, wherein the ultra-high temperature heating is in the range of from 125° to 160° C.

9. The method of claim 4, wherein the ultra-high temperature heating is in the range of from 125° to 160° C.

10. The method of claim 5, wherein the ultra-high temperature heating is in the range of from 125° to 160° C.

11. The product produced by the method of claim 1.
12. The product produced by the method of claim 2.
13. The product produced by the method of claim 3.
14. The product produced by the method of claim 4.
15. The product produced by the method of claim 5.
16. The product produced by the method of claim 6.
17. The product produced by the method of claim 7.
18. The product produced by the method of claim 8.
19. The product produced by the method of claim 9.
20. The product produced by the method of claim 10.

* * * * *

UNITED STATES PATENT AND TRADEMARK OFFICE
CERTIFICATE OF CORRECTION

PATENT NO. : 4,192,901
DATED : March 11, 1980
INVENTOR(S) : Mutsuo YASUMATSU et al.

It is certified that error appears in the above-identified patent and that said Letters Patent are hereby corrected as shown below:

UNDER [57] - ABSTRACT:

1) Line 8, change "$0.85 \leq X \leq 2.55$" to -- $0.85 \leq x \leq 2.55$ --.

IN THE SPECIFICATION:

2) Column 2, line 28, change "$0.85 \leq X \leq 2.55$" to -- $0.85 \leq x \leq 2.55$ --.
3) Column 3, line 17, change "$0.85 \leq X \leq 2.55$" to -- $0.85 \leq x \leq 2.55$ --.
4) Column 7, line 27, change "acidifed" to -- acidified --.

IN THE CLAIMS:

5) Column 10, line 4, change "$0.85 \leq X \leq 2.55$" to -- $0.85 \leq x \leq 2.55$ --.
6) Column 10, line 14, change "$0.85 \leq X \leq 1.7$" to -- $0.85 \leq x \leq 1.7$ --.
7) Column 10, line 19, change "$1.7 \leq X \leq 2.55$" to -- $1.7 \leq x \leq 2.55$ --.

Signed and Sealed this

Sixteenth Day of September 1980

[SEAL]

Attest:

SIDNEY A. DIAMOND

Attesting Officer   Commissioner of Patents and Trademarks